US009203242B2

United States Patent
Wang (10) Patent No.: US 9,203,242 B2
(45) Date of Patent: Dec. 1, 2015

(54) SYSTEM AND METHOD OF INTEGRATING WIND POWER AND TIDAL ENERGY

(75) Inventor: Li Wang, Kaohsiung (TW)

(73) Assignee: NATIONAL CHENG KUNG UNIVERSITY (TW)

(*) Notice: Subject to any disclaimer, the term of this patent is extended or adjusted under 35 U.S.C. 154(b) by 1009 days.

(21) Appl. No.: 13/312,132

(22) Filed: Dec. 6, 2011

(65) Prior Publication Data

US 2012/0139350 A1    Jun. 7, 2012

(30) Foreign Application Priority Data

Dec. 7, 2010    (TW) ................................ 99142693 A (51) Int. Cl.
 *H02J 1/00*    (2006.01)
 *H02J 3/38*    (2006.01)
 *H02J 3/36*    (2006.01)

(52) U.S. Cl.
 CPC ............ *H02J 3/383* (2013.01); *H02J 3/382* (2013.01); *H02J 3/386* (2013.01); *H02J 3/36* (2013.01); *Y02E 10/38* (2013.01); *Y02E 10/563* (2013.01); *Y02E 10/763* (2013.01); *Y02E 60/60* (2013.01); *Y10T 307/707* (2015.04)

(58) Field of Classification Search
 CPC .......... H02J 3/383; H02J 3/382; H02J 3/386; H02J 3/36; Y02E 10/563; Y02E 60/60; Y02E 10/763; Y02E 10/38
 See application file for complete search history.

(56) References Cited

U.S. PATENT DOCUMENTS

| 5,994,794 | A  | * | 11/1999 | Wehrlen ............................ 307/66 |
| 8,615,331 | B2 | * | 12/2013 | Garcia ............................ 700/287 |
| 8,841,796 | B2 | * | 9/2014  | Rosenvard ........................ 307/40 |
| 2009/0309365 | A1 | * | 12/2009 | Sauer et al. ..................... 290/53 |

FOREIGN PATENT DOCUMENTS

TW    200635185    10/2006

OTHER PUBLICATIONS

Piwko, R.J.; Larsen, E.V.; Wegner, C.A., "Variable frequency transformer—a new alternative for asynchronous power transfer," Power Engineering Society Inaugural Conference and Exposition in Africa, 2005 IEEE , vol., No., pp. 393,398, Jul. 11-15, 2005.*

Yuen et al, Matching a Permanent Magnet Synchronous Generator to a Fixed Pitch Vertical Axis Turbine for Marine Current Energy Conversion, IEEE Journal of Oceanic Engineering, Jan. 2009, pp. 24-31, vol. 34, No. 1.

Yao et al, Hybrid Offshore Wind and Tidal Turbine Energy Harvesting System with Independently Controlled Rectifiers, Energy Harvesting and Renewable Energies Laboratory, Electric Power and Power Electronics Center, Electrical Computer Engineering Department, Illinois Institute of Technology, IEEE, pp. 4577-4582, 978-1-4244-4649-0/09, 2009.

* cited by examiner

*Primary Examiner* — Daniel Cavallari
(74) *Attorney, Agent, or Firm* — Volpe and Koenig, P.C.

(57) ABSTRACT

A system integrating a tidal power generation device and a wind power generation device and a method thereof are provided. The system includes a wind power generation device, a tidal power generation device and an integration device. The wind power generation device generates a first voltage, the tidal power generation device generates a second voltage, and the integration device integrates the first and the second voltages for a further use.

20 Claims, 6 Drawing Sheets

SYSTEM AND METHOD OF INTEGRATING WIND POWER AND TIDAL ENERGY

CROSS REFERENCE TO RELATED APPLICATION

The application claims the benefit of Taiwan Patent Application No. 099142693, filed on Dec. 7, 2010, in the Taiwan Intellectual Property Office, the disclosures of which are incorporated herein in their entirety by reference.

FIELD OF THE INVENTION

The present invention relates to a system of integrating different energies produced by two different power generation devices and a method thereof, and more particularly to a system of integrating wind power and tidal energy and a method thereof.

BACKGROUND OF THE INVENTION

Recently, prices of the petrochemical fuel keep going up, and a use of the petrochemical fuel in power generation would result in the greenhouse effect, which destroys the ecological environment. Therefore, every country starts to seek some alternative energies without destroying the earth. Undoubtedly, the renewable energy, such as wind energy, solar energy, ocean energy and water power, etc., is one of the best choices of the alternative energy. The ocean energy includes tidal energy, ocean thermal energy and offshore wind energy.

Figure 1:
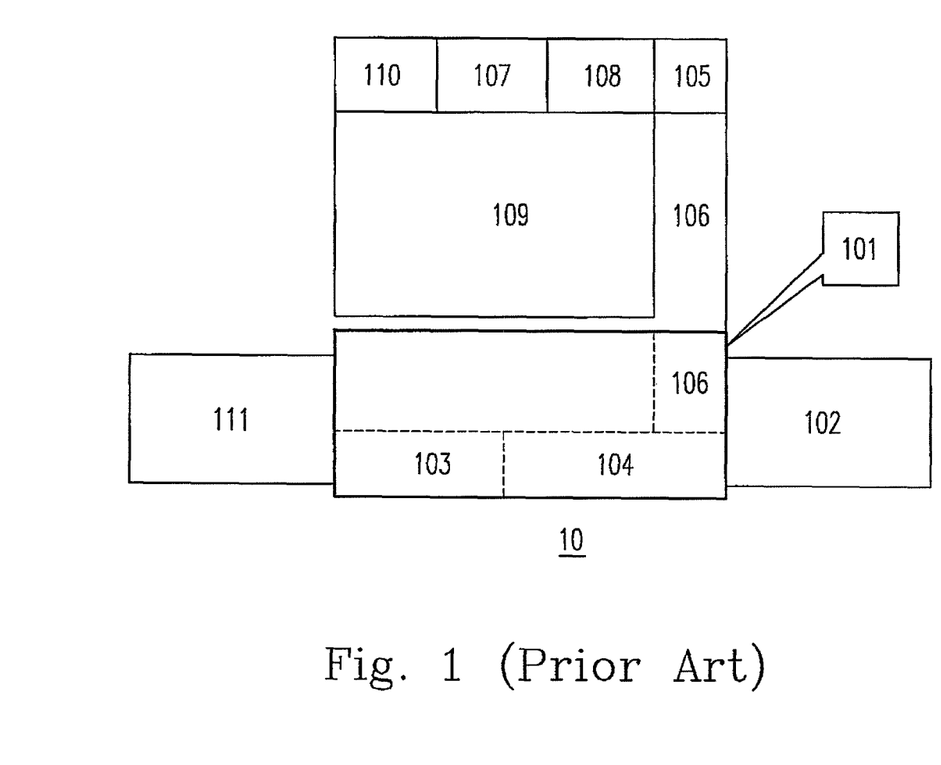
FIG. 1 is a diagram showing a conventional system integrating a tidal power generation device and a wind power generation device.

Please refer to FIG. 1, which is a diagram showing a conventional system integrating a tidal power generation device and a wind power generation device. The system 10 integrating the energies produced by the tidal power generation device and the wind power generation device is provided in Taiwan Patent No. I307995, which includes a dam 101, a tidal pool 102, a valve 103, a water turbine 104, a tide switching device 105, a transmission mechanism 106, an orienting device 107, a generator 108, a holder 109, a wind turbine 110, and the ocean 111.

The dam 101 surrounds the tidal pool 102, and the valve 103 and the water turbine 104 are disposed on the dam 101. The valve 103 can be operated to cause the water in the tidal pool 102 to flow toward the ocean 111, or cause the water in the ocean 111 to flow into the tidal pool 102 so as to activate the water turbine 104. The dam 101 can be used as a base of the wind power generation system. The holder 109 is disposed on the dam 101, and the wind turbine 110 is disposed on the holder 109 to drive the generator 108 to generate the power, whereby achieving the purpose of using the tide and wind power generation devices.

The tidal power generation device is one of important developments in capturing ocean energy. When the tide is used to generate power, the tide would induce a vertical water level difference and a horizontal movement of the ocean. A use of the vertical water level difference of the ocean in power generation is known as tidal difference power generation, while a use of the horizontal movement of the ocean in power generation is known as tidal current power generation. The tidal current power generation can be achieved by only setting a marine-current power generator in the ocean to get the kinetic energy of the ocean and convert it into electric power. Currently, the developed tidal current turbine is classified as a horizontal turbine and a vertical turbine according to whether the rotating shaft of the turbine is parallel or perpendicular to the sea level.

In 2009, Yuen at al. disclose a combination of a vertical tidal current turbine collocated with a permanent magnet generator with a low speed to be used in a tidal current power generating system. In the disclosure, it is described that if the tidal current turbine is controlled at a best rotating speed corresponding to the respective flowing speed of the tidal current, the turbine would operate in a best tip speed ratio, so that the turbine could make it possible to get the largest mechanical power at the flowing speed of the tidal current. In the disclosure, three different frameworks of vertical tidal current turbine are provided, and the steady state analyzing results of the three kinds of vertical tidal current turbines are compared to another when they are collocated with the permanent magnet generator with a low speed at different rotating speeds and different loadings. At the end of the disclosure, the authors analyze the rotating speed limitation and the temperature limitation of such tidal current power generation framework by using different software, and demonstrate that such tidal current power generation framework would not go beyond the limitations to cause damage to the machine when operating in a normal working range.

In 2009, Yao et al. disclose a hybrid renewable energy system including the offshore wind farm and the tidal current farm. In the disclosure, a dynamic model and a controlling framework of the renewable energy system are provided. The authors use the turbine to directly drive a permanent magnet generator for generating electric power, and conclude a model of the perpendicular axis (rotor reference axis) of the permanent magnet generator in the disclosure. It is also mentioned in the disclosure that a rectifier controlled by the pulse width modulation (PWM) can be used to control the rotating speed of the rotor of the generator, so as to achieve a purpose of tracking maximum power. At the end of the disclosure, the authors construct a simulated model by using MATLAB/Simulink software to demonstrate the possibility of the system provided thereby.

Conventional tidal power generation device transfers a linear movement to a rotating movement via the ways such as crank and crank shaft, and connects to a rotating type generator by increasing rotating speed via a gear box. Such a power generation scheme would result in loss of energy due to the intermediate energy change.

A tidal power generation device different from the conventional one, an integration of tidal power generation and wind power generation, and the power control thereof are provided in the present application.

SUMMARY OF THE INVENTION

The inventors of the present application consider that the development of green energy shall be implemented according to the respective conditions of the countries. For example, in Taiwan, there is a northeast monsoon in autumn and winter, which lasts half a year, and there is a southwest monsoon in summer. Besides the solar energy and water power, such island may have rich tital energy to be combined with the offshore wind energy. Accordingly, a system of integrating wind and tidal power generations and a method thereof are provided in the present invention.

Furthermore, the entire machine of the present invention integrates the systems of wind and tidal power generations, and thus when encountering an environment such as a season without enough wind for power generation, there is still a tidal power generation to make up the deficiency. Therefore, a drawback of shortage of economic efficiency resulting from a single power generation system affected by the factors of the environment could be prevented.

In the present application, the offshore wind farm, the tidal current farm power generation system without a dam and the flywheel energy storage system are applied to the tidal current farm power generation system with a permanent magnet generator, and the flywheel energy storage system is connected to the common alternating-current (AC) bus of the hybrid renewable energy system. The flywheel energy storage system can appropriately store and/or discharge energy to stabilize the transmission of power.

The respective mathematical models of the equivalent aggregated offshore wind farm, the tide farm, the variable frequency transformer, the flywheel energy storage system, the high-voltage direct-current (HVDC) transmission system and so on are established in the present invention, and by using the constructed models, three configurations of the system are provided as follows: (1) integrated offshore wind farm and seashore tidal energy farm connected to utility grid through a variable frequency transformer; (2) integrated offshore wind farm and seashore tidal energy farm connected to utility grid using a flywheel energy storage system; and (3) integrated offshore wind farm and seashore tidal energy farm connected to utility grid through a high-voltage DC transmission system.

The inventors also complete steady-state analysis of the three configurations of the system, which includes analysis of steady-state operating points and characteristics. By the analysis of steady-state operating points, whether the system can be operated in a normal range under various conditions could be determined, and by the analysis of characteristics, whether the system can be maintained stable when disturbance exists therein could be analyzed.

Moreover, the inventors also complete the dynamic analysis of the three configurations of the system, which includes verification of whether the system could be maintained to normally operate after various disturbances are applied to the system. In the designed part of the controller of each system, each of the three configurations uses a designed proportional-integral-derivative (PID) controller, which is commonly used in industrial process control, to improve damping of system, so as to facilitate the restoring of the system to be stable when subjecting to disturbances and to decrease the oscillatory conditions of the system resulting from the disturbances. By referring to the data shown in Tables I and II, it appears that the system of integrating wind and tidal power generations and methods thereof provided in the present invention can be implemented in the pertained industry.

A system of integrating the energies produced from wind and tidal power generation devices and a method thereof are provided in the present invention, and the integration of generated powers of individual power generation systems could result in larger electric energy production than that produced by a single power generation device, so that enough power can supply to the consumers.

In accordance with one aspect of the present invention, a system integrating a tidal power generation device and a wind power generation device is provided. The system comprises a wind power generation device, a tidal power generation device and an integration device. The wind power generation device generates a first voltage, the tidal power generation device generates a second voltage, and the integration device integrates the first and the second voltages.

In accordance with another aspect of the present invention, an integrated power generating system is provided. The system comprises a first power generation device, a second power generation device and an integration device. The second power generation device uses a way of power generation different from that used by the first power generation device, and the integration device integrates the first and the second power generation devices.

According to the mentioned aspect, the first power generation device generates a first voltage, the second power generation device generates a second voltage, and the integration device integrates the first and the second voltages for a further use.

In accordance with a further aspect of the present invention, a method of integrating a first and a second power generations is provided. The method includes steps of generating a first voltage by the first power generation, generating a second voltage by the second power generation different from the first power generation, and integrating the first and the second voltages.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of embodiments of this invention are presented herein for the purposes of illustration and description only; it is not intended to be exhaustive or to be limited to the precise form disclosed.

Figure 2:
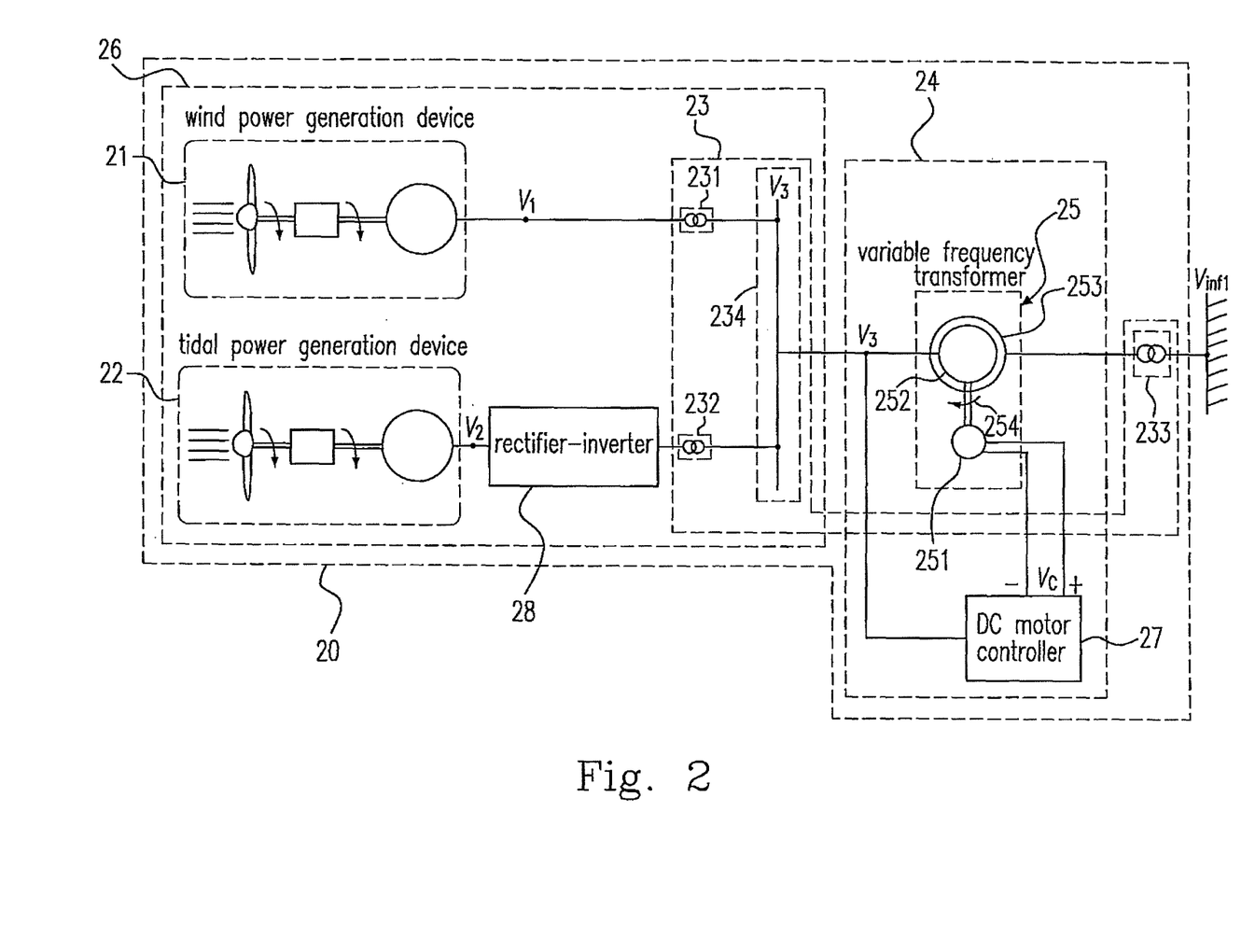
FIG. 2 is a diagram showing an embodiment of the system integrating a tidal power generation device and a wind power generation device of the present invention.

Please refer to FIG. 2, which is a diagram showing an embodiment of the system integrating a tidal power generation device and a wind power generation device of the present invention. The system 20 includes a wind power generation device 21, a tidal power generation device 22 and an integration device 23. The wind power generation device 21 generates a first voltage $V_1$, the tidal power generation device 22 generates a second voltage $V_2$, and the integration device 23 integrates the first and the second voltages ($V_1$, $V_2$) for a further use. The wind power generation device 21 may include a doubly fed induction generator (DFIG), and the tidal power generation device 22 may include a flow turbine generator without a dam body. The integration device 23 may include a power-generation integrating device.

According to the mentioned embodiment, the system 20 further includes a rectifier-inverter 28. A subsequent boosting procedure will be performed for the second voltage $V_2$ generated from the tidal power generation device 22 after the second voltage $V_2$ passes through the rectifier-inverter 28.

According to the embodiment shown in FIG. 2, the integration device 23 may include a first voltage booster 231, a second voltage booster 232, a third voltage booster 233 and a bus 234. The first voltage booster 231 and the second voltage booster 232 are respectively connected to the bus 234. According to the mentioned embodiment, the first voltage $V_1$ is boosted to a third voltage $V_3$ by the first voltage booster 231, the second voltage $V_2$ is rectified and inverted by the rectifier-inverter 28 and then boosted by the second voltage booster 232 to the third voltage $V_3$. The system 20 may further include a voltage regulating system 24, which is connected to the third voltage booster 233 and regulates the third voltage $V_3$.

According to the embodiment shown in FIG. 2, when the tidal power generation device 22 includes a flow turbine generator without a dam body, the wind power generation device 21 and the tidal power generation device 22 may generate active power of 80 megawatts (MW) and 40 MW, respectively. The wind power generation device 21 may generate the first voltage $V_1$ being an AC voltage of 0.69 kV, and the second voltage $V_2$, which is generated from the tidal power generation device 22 and then rectified and inverted by the rectifier-inverter 28, may be an AC voltage of 0.69 kV. The first and the second voltages ($V_1$, $V_2$) are respectively boosted by the first and second voltage boosters (231, 232) to 23 kV, i.e. the third voltage $V_3$. The powers generated by the wind power generation device 21 and the tidal power generation device 22 would converge via the bus 234. The voltage regulating system 24 may include a variable frequency transformer 25 and a DC motor controller 27. The variable frequency transformer 25 is connected to the third voltage booster 233 and regulates the third voltage $V_3$, which is 23 kV in this embodiment. The third voltage booster 233 boosts the third voltage $V_3$ from 23 kV to 161 kV for a use in a grid of $V_{inf1}$.

In a further embodiment, the system 20 shown in FIG. 2 includes a sub-system 26 integrating tidal and wind power generation devices. The sub-system 26 includes the wind power generation device 21, the tidal power generation device 22, the first voltage booster 231, the second voltage booster 232, the bus 234 and so on. In the embodiment of the sub-system 26, the devices for transmitting power such as the third voltage booster 233 and the voltage regulating system 24 may be omitted to reduce the loss of power during a transfering process, especially when the facilities using the power are just at the coast.

Please refer to FIG. 2 again, the variable frequency transformer 25 may include a DC motor 251, a rotor 252 and a stator 253. The DC motor 251 generates a torque 254 to apply to the rotor 252. The DC motor controller 27 detects a variation of the third voltage $V_3$ for modifying the positive/negative and the magnitude of a control voltage $V_c$, whereby adjusting the direction and the magnitude of the torque 254. When the third voltage $V_3$ is disturbed, under the mentioned control over the torque 254 would achieve a fuction of stabilizing the voltage. For example, when the third voltage $V_3$ increases, the torque 254 generated by the DC motor 251 is applied to the rotor 252 in a direction contrary to the rotation direction of the rotor 252; when the third voltage $V_3$ decreases, the torque 254 generated by the DC motor 251 is applied to the rotor 252 in a direction the same as the rotation direction of the rotor 252; and when the third voltage $V_3$ has no variations, the DC motor 251 will not generate the torque 254.

Figure 3:
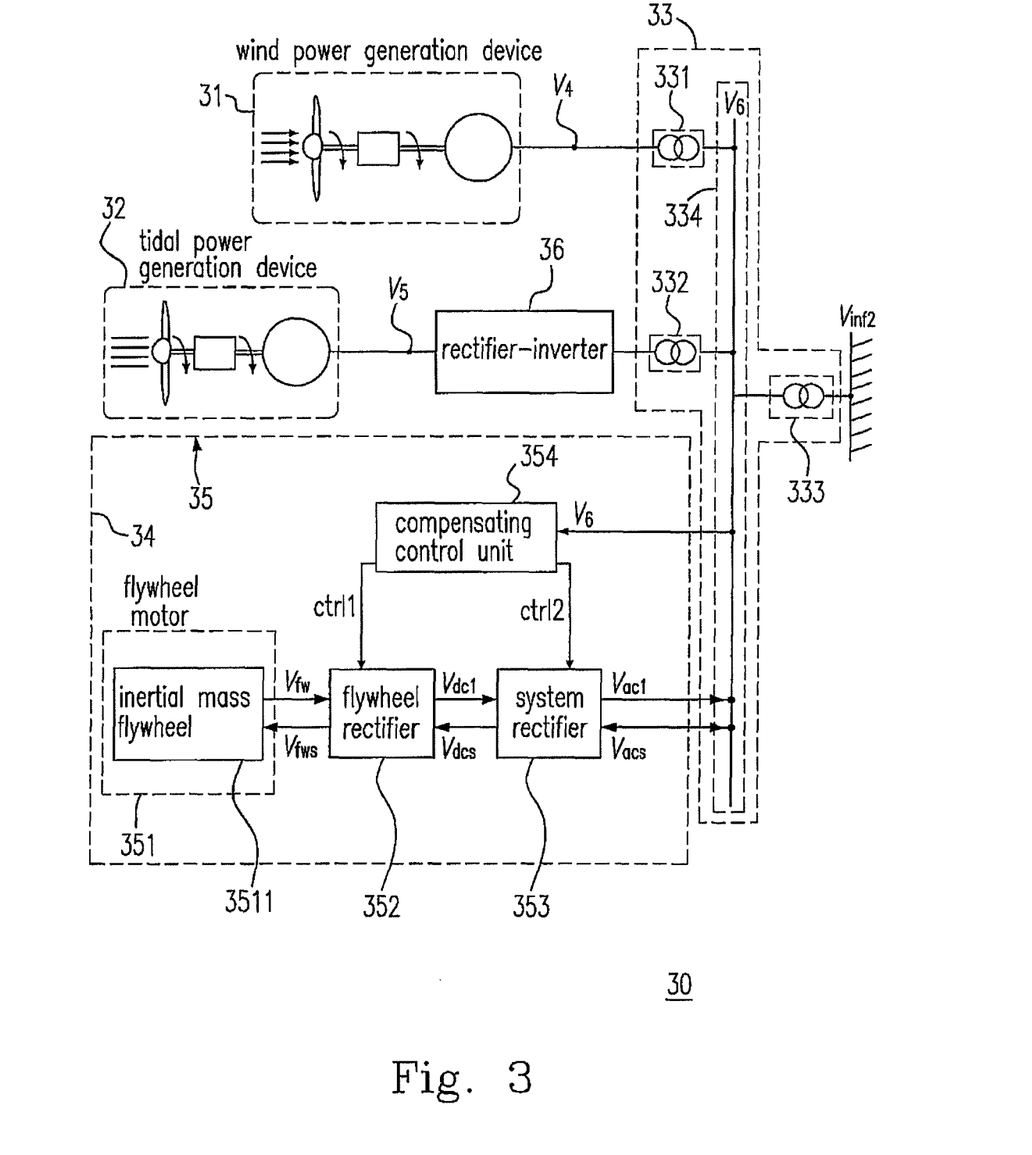
FIG. 3 is a diagram showing another embodiment of the system integrating a tidal power generation device and a wind power generation device of the present invention.

Please refer to FIG. 3, which is a diagram showing another embodiment of the system integrating a tidal power generation device and a wind power generation device of the present invention. The system 30 includes a wind power generation device 31, a tidal power generation device 32 and an integration device 33. The wind power generation device 31 generates a first voltage $V_4$, the tidal power generation device 32 generates a second voltage $V_5$, and the integration device 33 integrates the first and the second voltages ($V_4$, $V_5$) for a further use.

According to the mentioned embodiment, the system 30 further includes a rectifier-inverter 36. A subsequent boosting procedure will be performed for the second voltage $V_5$ generated from the tidal power generation device 32 after the second voltage $V_5$ passes through the rectifier-inverter 36.

According to the mentioned embodiment, the integration device 33 may include a first voltage booster 331, a second voltage booster 332, a third voltage booster 333 and a bus 334. The first voltage booster 331 and the second voltage booster 332 are respectively connected to the bus 334. The first voltage $V_4$ is boosted to a third voltage $V_6$ by the first voltage booster 331, the second voltage $V_5$ is rectified and inverted by the rectifier-inverter 36 and then boosted by the second voltage booster 332 to the third voltage $V_6$. The system 30 may further include a voltage regulating system 34, which is connected to the third voltage booster 333 and regulates the third voltage $V_6$.

According to the mentioned embodiment, when the tidal power generation device 32 includes a flow turbine generator without a dam body, the wind power generation device 31 and the tidal power generation device 32 may generate active power of 80 megawatts (MW) and 40 MW, respectively. The wind power generation device 31 may generate the first voltage $V_4$ being an AC voltage of 0.69 kV, and the second voltage $V_2$, which is generated from the tidal power generation device 32 and then rectified and inverted by the rectifier-inverter 36, may be an AC voltage of 0.69 kV. The first and the second voltages ($V_4$, $V_5$) are respectively boosted by the first and second voltage boosters (331, 332) to 23 kV, i.e. the third voltage $V_6$. The powers generated by the wind power generation device 31 and the tidal power generation device 32 would combine via the bus 334. The voltage regulating system 34 may include a flywheel energy storage system 35. The flywheel energy storage system 35 is connected to the third voltage booster 333 and regulates the third voltage $V_6$, which is 23 kV in this embodiment. The third voltage booster 333 boosts the third voltage $V_6$ from 23 kV to 161 kV for a use in a grid of $V_{inf2}$.

In the embodiment shown in FIG. 3, the flywheel energy storage system 35 includes a flywheel machine 351, a flywheel rectifier 352, a system rectifier 353 and a compensating control unit 354. The flywheel machine 351 includes an inertial mass flywheel 3511, which stores the electric energy from the bus 334 in a form of a kinetic energy by using a way of high-speed rotation. The flywheel energy storage system 35 uses the flywheel machine 351 as an energy transferring device between the electric energy and the kinetic energy. When the energy in the flywheel machine 351 is transferred from the electric energy to the kinetic energy, the flywheel machine 351 is operated in a motor mode, and thus the rotating speed of the inertial mass flywheel 3511 will be increased. When the energy in the flywheel machine 351 is transferred from the kinetic energy to the electric energy, the flywheel machine 351 is operated in a generator mode, and the electric energy transferred from the kinetic energy will be output to compensate the flywheel energy storage system 35. In the beginning, the flywheel machine 351 has to be provided with power source for the activation, and then the flywheel machine 351 would perform the functions of energy storage or power generation.

In the embodiment shown in FIG. 3, the compensating control unit 354 detects the third voltage $V_6$ on the bus 334 to control the flywheel rectifier 352 and the system rectifier 353. When a value of the third voltage $V_6$ is less than a reference value, the compensating control unit 354 uses a control signal ctrl1 to control the flywheel rectifier 352 to transfer an AC voltage $V_{fw}$ output from the flywheel machine 351 to a DC voltage $V_{dc1}$, and then the compensating control unit 354 uses a control signal ctrl2 to control the system rectifier 353 to transfer the DC voltage $V_{dc1}$ to an AC voltage $V_{ac1}$ for compensating the third voltage $V_6$. When the value of the third voltage $V_6$ is larger than the reference value, the compensating control unit 354 uses the control signal ctrl2 to control the system rectifier 353 to transfer a difference voltage $V_{acs}$ to an DC voltage $V_{dcs}$, wherein the difference voltage $V_{acs}$ is derived by subtracting the reference value from the value of the third voltage $V_6$, and then the compensating control unit 354 uses the control signal ctrl1 to control the flywheel rectifier 352 to transfer the DC voltage $V_{dcs}$ to an AC voltage $V_{fws}$, which is to be input into the flywheel motor 351. The flywheel machine 351 transfers the electric energy to the kinetic energy so that the inertial mass flywheel 3511 may store the energy in a way of kinetic energy. When the wind power generation device 31 is affected by a variation of wind speed and thus causes the third voltage $V_6$ to be disturbed, the system 30 would transmit the power more stably by using the flywheel energy storage system 35.

Figure 4:
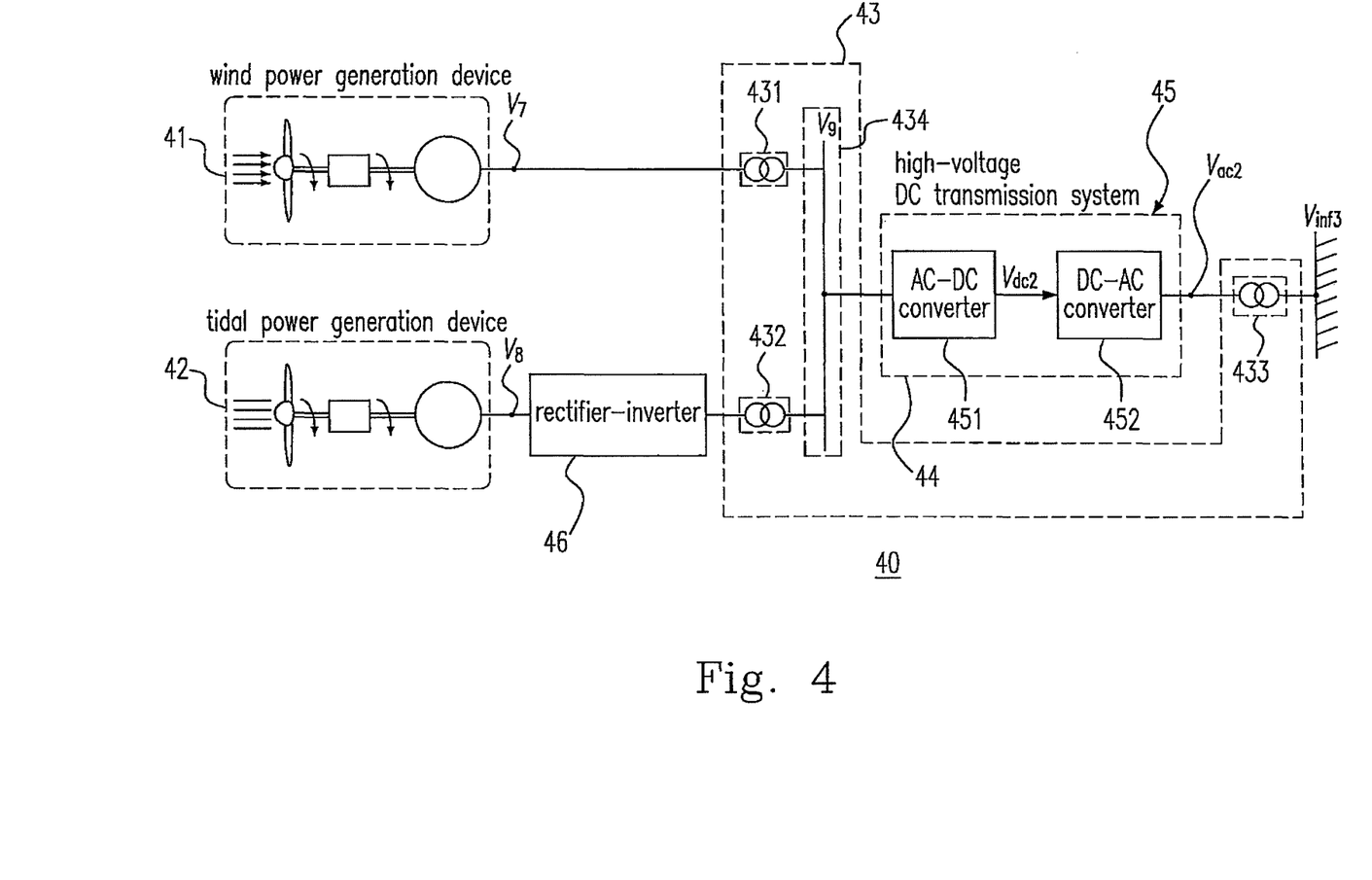
FIG. 4 is a diagram showing a further embodiment of the system integrating a tidal power generation device and a wind power generation device of the present invention.

Please refer to FIG. 4, which is a diagram showing a further embodiment of the system integrating a tidal power generation and a wind power generation of the present invention. The system 40 includes a wind power generation device 41, a tidal power generation device 42 and an integration device 43. The wind power generation device 41 generates a first voltage $V_7$, the tidal power generation device 42 generates a second voltage $V_8$, and the integration device 43 integrates the first and the second voltages ($V_7$, $V_8$) for a further use.

According to the mentioned embodiment, the system 40 further includes a rectifier-inverter 46. A subsequent boosting procedure will be performed for the second voltage $V_8$ generated from the tidal power generation device 42 after the second voltage $V_8$ passes through the rectifier-inverter 46.

According to the mentioned embodiment, the integration device 43 may include a first voltage booster 431, a second voltage booster 432, a third voltage booster 433 and a bus 434. The first voltage booster 431 and the second voltage booster 432 are respectively connected to the bus 434. The first voltage $V_7$ is boosted to a third voltage $V_9$ by the first voltage booster 431, the second voltage $V_8$ is rectified and inverted by the rectifier-inverter 46 and then boosted by the second voltage booster 432 to the third voltage $V_9$. The system 40 may further include a voltage regulating system 44, which is connected to the third voltage booster 433 and regulates the third voltage $V_9$.

According to the mentioned embodiment, when the tidal power generation device 42 includes a flow turbine generator without a dam body, the wind power generation device 41 and the tidal power generation device 42 may respectively generate active power of 80 megawatts (MW) and 40 MW. The wind power generation device 41 may generate the first voltage $V_7$ being an AC voltage of 0.69 kV, and the second voltage $V_8$, which is generated from the tidal power generation device 42 and then rectified and inverted by the rectifier-inverter 46, may be an AC voltage of 0.69 kV. The first and the second voltages ($V_7$, $V_8$) are respectively boosted by the first and second voltage boosters (431, 432) to 23 kV, i.e. the third voltage $V_9$. The powers generated by the wind power generation device 41 and the tidal power generation device 42 would converge via the bus 434. The voltage regulating system 44 may include a high-voltage DC transmission system 45. The high-voltage DC transmission system 45 is connected to the third voltage booster 433 and regulates the third voltage $V_9$, which is 23 kV in this embodiment. The third voltage booster 433 then boosts the third voltage $V_9$ from 23 kV to 161 kV for a use in a grid of $V_{inf3}$.

In the embodiment shown in FIG. 4, the high-voltage DC transmission system 45 includes a AC-DC converter 451 and a DC-AC converter 452. The AC-DC converter 451 transfers the third voltage $V_9$ to a DC voltage $V_{dc2}$, and then the DC-AC converter 452 transfers the DC voltage $V_{dc2}$ to an AC voltage $V_{ac2}$. When one of the third voltage $V_9$ and the AC voltage $V_{ac2}$ is disturbed, the high-voltage DC transmission system 45 can rapidly compensate the third voltage $V_9$ or the AC voltage $V_{ac2}$.

According to the mentioned embodiments, each of the power generation systems provided in the present invention is an integrated power generating system, which includes a first power generation device, a second power generation device and an integration device. The first power generation device generates a first voltage. The second power generation device uses a way of power generation different from that used by the first power generation device, and generates a second voltage. The integration device integrates the first and the second voltages for a further use. The integration device is a power-generation integrating device for integrating the first and the second power generation devices for a further use.

Figure 5A:
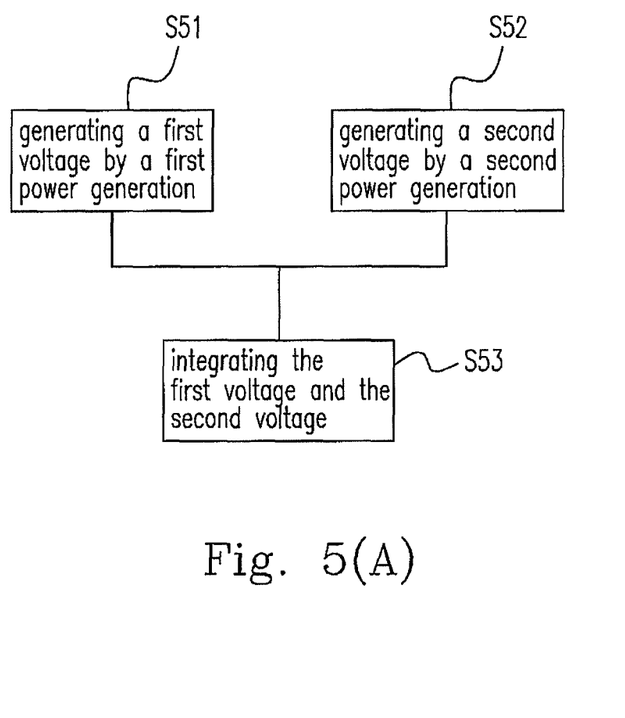
FIG. 5(A) is a flow chart showing an embodiment of a method of integrating a first and a second power generation devices of the present invention.

Please refer to FIG. 5(A), which is a flow chart showing an embodiment of a method of integrating a first and a second power generations of the present invention. The method of integrating the first and the second power generation devices includes steps of: generating a first voltage by the first power generation (step S51); generating a second voltage by the second power generation different from the first power generation (step S52); and integrating the first and the second voltages (step S53).

Figure 5B:
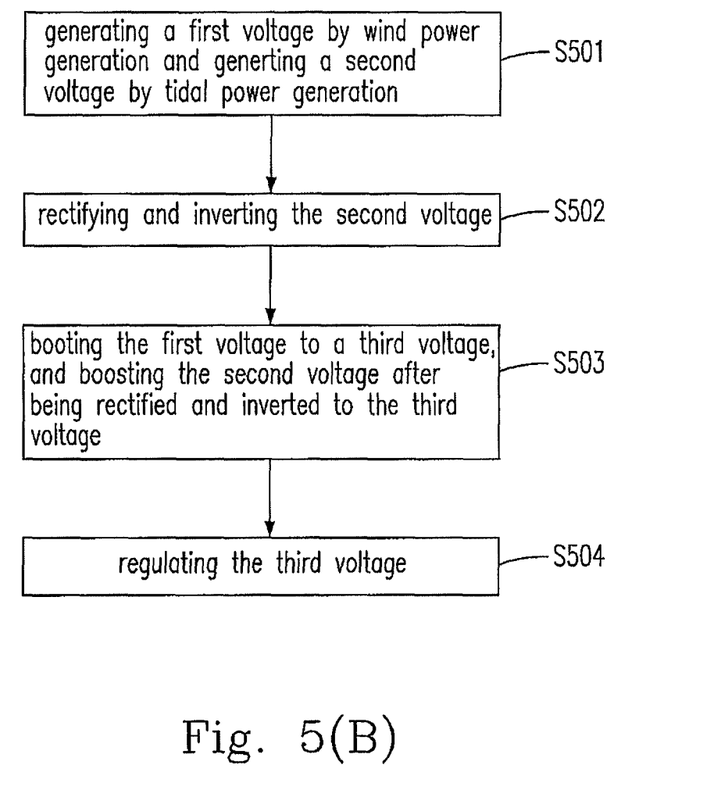
FIG. 5(B) is a flow chart showing an embodiment of a method of integrating a tidal power generation device and a wind power generation device of the present invention.

Please refer to FIG. 5(B), which is a flow chart showing an embodiment of a method of integrating a tidal power generation and a wind power generation of the present invention. The method includes following steps of: generating a first voltage by the wind power generation device and generating a second voltage by the tidal power generation device (step S501); rectifying and inverting the second voltage (step S502); boosting the first voltage to a third voltage, and boosting the second voltage, which has been rectified and inverted in the step S502, to the third voltage (step S503); and regulating the third voltage (step S504).

In a further embodiment, a system integrating a tidal power generation device and a wind power generation device is provided. The system includes a wind power generation device, a tidal power generation device and a power integration device. The wind power generation device generates a first voltage, the tidal power generation device generates a second voltage, and the power integration device integrates the first and the second voltages for a further use.

In a further embodiment, the steady-state analysis of the system integrating a tidal power generation and a wind power generation is provided under the conditions of a fixed wind speed of 12 m/s and a tide speed ranging from 1 m/s to 2.25 m/s. When the third voltage ($V_3, V_6, V_9$) on the bus (234, 334, 434) is disturbed due to a change being one of the wind speed and the tide speed, which respectively affect the wind power generation device (21, 31, 41) and the tidal power generation device (22, 32, 42), the variable frequency transformer 25 of the embodiment shown in FIG. 2 will appropriately adjust the torque 254 output from the DC motor 251 to stabilize the third voltage $V_3$; the flywheel energy storage system 35 of the embodiment shown in FIG. 3 will make the power to be transmitted more stably through the energy-storage and energy-release characteristics thereof; and the high-voltage DC transmission system 45 of the embodiment shown in FIG. 4 will control the third voltage $V_9$ on the bus 434 for stabilizing the transmission of power. When a condition of three-phase short circuit happens in the grid ($V_{inf1}, V_{inf2}, V_{inf3}$), huge oscillation may be resulted therefrom, and the voltage regulating system (24, 34, 44) in the mentioned embodiments will improve the condition of oscillation.

In any of the preceding embodiments, the voltage regulating system (24, 34, 44) may further include a proportional-integral-derivative (PID) controller to improve damping of the system (20, 30, 40). When disturbances happen on the rotating torque of the wind power generation device (21, 31, 41), the third voltage ($V_3, V_6, V_9$) could be more stable by the control of the PID controller, so that the power could be transmitted more stably.

Please refer to Table I, which shows the data of the steady-state conditions of the wind power generation device 31, the tidal power generation device 32, the integration device 33 and the flywheel energy storage system 35, respectively, under the simulation conditions of a fixed wind speed of 12 m/s corresponding to variable tidal speeds.

TABLE I

| | | Tidal Speed | | | | | |
|---|---|---|---|---|---|---|---|
| | | 1 m/s | 1.25 m/s | 1.5 m/s | 1.75 m/s | 2 m/s | 2.25 m/s |
| Devices | Wind Power Generation Device | −34.72 ± j208.62 | −34.73 ± j208.59 | −34.74 ± j208.53 | −34.76 ± j208.45 | −34.80 ± j208.35 | −34.85 ± j208.21 |
| | Tidal Power Generation Device | −12.29 ± j37.337 | −15.39 ± j35.961 | −18.50 ± j34.194 | −21.60 ± j31.968 | −24.69 ± j29.179 | −27.77 ± j25.643 |
| | Integration Device | −9.03 ± j31887 | −9.03 ± j31887 | −9.03 ± j31887 | −9.04 ± j31887 | −9.04 ± j31887 | −9.04 ± j31887 |
| | Flywheel Energy Storage System | −5.46 ± j366.78 | −5.53 ± j366.73 | −5.62 ± j366.65 | −5.75 ± j366.54 | −5.91 ± j366.39 | −6.11 ± j366.18 |

In Table I, the real-part characteristics (1/s) are used to indicate the stability of the respective devices. The characteristics are represented by a complex number, the larger of the negative real part means the faster that the voltage is restored to be stable, and the imaginary part represents the oscillation frequency.

Please refer to Table II, which shows the data of the steady-state conditions of the wind power generation device 31, the tidal power generation device 32, the integration device 33 and the flywheel energy storage system 35, respectively with a PID controller therein, under the simulation condition of a fixed wind speed of 12 m/s.

TABLE II

| | | Tidal Speed | | | | | |
|---|---|---|---|---|---|---|---|
| | | 1 m/s | 1.25 m/s | 1.5 m/s | 1.75 m/s | 2 m/s | 2.25 m/s |
| Devices | Wind Power Generation Device | −34.47 ± j208.68 | −34.48 ± j208.64 | −34.49 ± j208.59 | −34.51 ± j208.50 | −34.54 ± j208.39 | −34.60 ± j208.25 |
| | Tidal Power Generation Device | −12.292 ± j37.337 | −15.39 ± j35.961 | −18.50 ± j34.194 | −21.60 ± j31.968 | −24.69 ± j29.179 | −27.77 ± j25.643 |
| | Integration Device | −8.31 ± j31887 | −8.31 ± j31887 | −8.31 ± j31887 | −8.31 ± j31887 | −8.31 ± j31887 | −8.31 ± j31887 |

TABLE II-continued

| | | Tidal Speed | | | | |
|---|---|---|---|---|---|---|
| | 1 m/s | 1.25 m/s | 1.5 m/s | 1.75 m/s | 2 m/s | 2.25 m/s |
| Flywheel Energy Storage System | −5.46 ± j366.78 | −5.53 ± j366.73 | −5.62 ± j366.65 | −5.75 ± j366.54 | −5.91 ± j366.39 | −6.11 ± j366.18 |

As similar to Table I, the real-part characteristics (1/s) represented by complex numbers are used in Table II to indicate the stability of the respective devices. The larger of the negative real part means the faster that the voltage is restored to be stable, and the imaginary part represents the oscillation frequency.

Embodiments

1. A system integrating a tidal power generation device and a wind power generation device, wherein the system comprises a wind power generation device generating a first voltage, a tidal power generation device generating a second voltage, and an integration device integrating the first and the second voltages.

2. A system of embodiment 1, wherein the integration device integrates the first and the second voltages for a further use.

3. A system of any of the preceding embodiments, wherein the system further comprises a rectifier-inverter.

4. A system of any of the preceding embodiments, wherein the integration device includes a first voltage booster, a second voltage booster, a third voltage booster and a bus.

5. A system of any of the preceding embodiments, wherein the first voltage booster is connected to the second voltage booster via the bus.

6. A system of any of the preceding embodiments, wherein the first voltage is boosted to a third voltage by the first voltage booster, the second voltage is rectified and inverted by the rectifier-inverter and then boosted by the second voltage booster to the third voltage.

7. A system of any of the preceding embodiments, further comprising a voltage regulating system connected to the third voltage booster and regulating the third voltage.

8. A system of any of the preceding embodiments, wherein the voltage regulating system includes one selected from a group consisting of a variable frequency transformer, a flywheel energy storage system and a high-voltage direct-current (DC) transmission system.

9. A system of any of the preceding embodiments, wherein the variable frequency transformer includes a DC motor, a stator and a rotor, the DC motor generates a torque to be applied to the rotor, and the DC motor adjusts the torque in response to the third voltage.

10. A system of any of the preceding embodiments, wherein the wind power generation device includes a doubly fed induction generator (DFIG), and the tidal power generation device includes a flow turbine generator without a dam body.

11. An integrated power generating system, comprising a first power generation device, a second power generation device using a way of power generation different from that used by the first power generation device, and an integration device integrating the first and the second power generation devices.

12. A system of any of the preceding embodiments, wherein the first power generation device generates a first voltage, the second power generation device generates a second voltage, and the integration device integrates the first and the second voltages for a further use.

13. A system of any of the preceding embodiments, wherein the system further comprises a rectifier-inverter and a bus.

14. A system of any of the preceding embodiments, wherein the integration device includes a first voltage booster, a second voltage booster and a third voltage booster.

15. A system of any of the preceding embodiments, wherein the first, the second and the third voltage boosters are connected to one another via the bus.

16. A system of any of the preceding embodiments, wherein the first voltage is boosted to a third voltage by the first voltage booster, the second voltage is rectified and inverted by the rectifier-inverter and then boosted by the second voltage booster to the third voltage, and the third voltage booster boosts the third voltage to a fourth voltage.

17. A system of any of the preceding embodiments, further comprising a voltage regulating system connected to the third voltage booster and regulating the fourth voltage.

18. A system of any of the preceding embodiments, wherein the voltage regulating system includes one selected from a group consisting of a variable frequency transformer, a flywheel energy storage system and a high-voltage direct-current (DC) transmission system.

19. A system of any of the preceding embodiments, wherein the first power generation device includes one of a tidal power generation device and a wind power generation device.

20. A system of any of the preceding embodiments, wherein the second power generation device includes one of a tidal power generation device and a wind power generation device.

21. A method of integrating a first and a second power generations, comprising steps of: generating a first voltage by the first power generation; generating a second voltage by the second power generation different from the first power generation; and integrating the first and the second voltages.

22. A method of any of the preceding embodiments, wherein the first power generation is one of a tidal power generation device and a wind power generation device, and the first and the second voltages are integrated for a further use.

23. A method of any of the preceding embodiments, wherein the second power generation is one of a tidal power generation device and a wind power generation device, and the first and the second voltages are integrated for a further use.

24. A method of any of the preceding embodiments, wherein the first power generation is a wind power generation device, and the second power generation is a tidal power generation device.

25. A method of any of the preceding embodiments, wherein the step of integrating the first and the second voltages includes a sub-step of rectifying, inverting and then boosting the second voltage to a third voltage.

26. A method of any of the preceding embodiments, wherein the step of integrating the first and the second voltages includes a sub-step of boosting the first voltage to the third voltage.

27. A method of any of the preceding embodiments, wherein the step of integrating the first and the second voltages further includes a sub-step of regulating the third voltage.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A system integrating a tidal power generation device and a wind power generation device, the system comprising:
    a wind power generation device generating a first voltage;
    a tidal power generation device generating a second voltage;
    an integration device integrating the first and the second voltages to generate a third voltage; and
    a flywheel energy storage system connected to the integration device, and including:
        a flywheel machine storing a kinetic energy;
        a flywheel rectifier;
        a system rectifier; and
        a compensating control unit detecting the third voltage generated by the integration device, wherein:
            in a first instance, a first control signal is used to control the flywheel rectifier to transform a first AC voltage output from the flywheel machine to a first DC voltage, a second control signal is used to control the system rectifier to transform the first DC voltage to a second AC voltage for compensating the third voltage and the flywheel machine is controlled to convert the kinetic energy to an electric energy when the third voltage is not larger than a reference voltage of the system; and
            in a second instance, the second control signal is used to control the system rectifier to transform a difference voltage to a second DC voltage, the first control signal is used to control the flywheel rectifier to transform the second DC voltage to a third AC voltage received by the flywheel machine and the flywheel machine is controlled to convert the electric energy to the kinetic energy when the third voltage is not less than the reference voltage of the system.

2. A system as claimed in claim 1, wherein:
    the integration device integrates the first and the second voltages for a further use;
    the system further comprises a rectifier-inverter;
    the integration device includes a first voltage booster, a second voltage booster, a third voltage booster and a bus;
    the first voltage booster is connected to the second voltage booster via the bus; and
    the first voltage is boosted to the third voltage by the first voltage booster, the second voltage is rectified and inverted by the rectifier-inverter and then boosted by the second voltage booster to the third voltage.

3. A system as claimed in claim 2, further comprising a voltage regulating system connected to the third voltage booster and regulating the third voltage.

4. A system as claimed in claim 3, wherein the voltage regulating system includes one selected from a group consisting of a variable frequency transformer, the flywheel energy storage system and a high-voltage direct-current (DC) transmission system.

5. A system as claimed in claim 4, wherein:
    the variable frequency transformer includes a DC motor, a stator and a rotor;
    the DC motor generates a torque to be applied to the rotor; and
    the DC motor adjusts the torque in response to the third voltage.

6. A system as claimed in claim 1, wherein the wind power generation device includes a doubly fed induction generator (DFIG), and the tidal power generation device includes a flow turbine generator without a dam body.

7. An integrated power generating system, comprising:
    a first power generation device;
    a second power generation device using a way of power generation different from that used by the first power generation device;
    an integration device having a bus and integrating the first and the second power generation devices; and
    a flywheel energy storage system connected to the integration device, and including:
        a flywheel machine storing a kinetic energy; and
        a compensating control unit detecting a third voltage generated by the integration device, and configured such that:
            in a first instance a first AC voltage output from the flywheel machine is transformed to a first DC voltage, the first DC voltage is transformed to a second AC voltage for compensating the third voltage and the flywheel machine in controlled to convert the kinetic energy to an electric energy; and
            in a second instance difference voltage in the bus of the integrated device is transformed to a second DC voltage, the second DC voltage is transformed to a third AC voltage received by the flywheel machine and the electric energy is converted to the kinetic energy.

8. A system as claimed in claim 7, wherein the first power generation device generates a first voltage, the second power generation device generates a second voltage, and the integration device integrates the first and the second voltages for a further use.

9. A system as claimed in claim 8, wherein:
    the system further comprises a rectifier-inverter and a bus;
    the integration device includes a first voltage booster, a second voltage booster and a third voltage booster;
    the first, the second and the third voltage boosters are connected to one another via the bus; and
    the first voltage is boosted to the third voltage by the first voltage booster, the second voltage is rectified and inverted by the rectifier-inverter and then boosted by the second voltage booster to the third voltage, and the third voltage booster boosts the third voltage to a fourth voltage.

10. A system as claimed in claim 9, further comprising a voltage regulating system connected to the third voltage booster and regulating the fourth voltage.

11. A system as claimed in claim 10, wherein the voltage regulating system includes one selected from a group consisting of a variable frequency transformer, the flywheel energy storage system and a high-voltage direct-current (DC) transmission system.

12. A system as claimed in claim 7, wherein the first power generation device includes one of a tidal power generation device and a wind power generation device.

13. A system as claimed in claim 7, wherein the second power generation device includes one of a tidal power generation device and a wind power generation device.

14. A method of integrating a first and a second power generations in a system including a flywheel energy storage system and having a reference voltage, the flywheel energy storage system includes a flywheel machine, and the method comprising steps of:
   generating a first voltage by the first power generation;
   generating a second voltage by the second power generation different from the first power generation;
   integrating the first and the second voltages to generate a third voltage;
   storing a kinetic energy of the flywheel energy storage system;
   detecting the third voltage;
   in a first instance, transforming a first AC voltage output from the flywheel machine to a first DC voltage, transforming the first DC voltage to a second AC voltage for compensating the third voltage and converting the kinetic energy to an electric energy when the third voltage is not larger than the reference voltage of the system; and
   in a second instance, transforming a difference voltage to a second DC voltage, transforming the second DC voltage to a third AC voltage received by the flywheel machine and converting the electric energy to the kinetic energy when the third voltage is not less than the reference voltage of the system.

15. A method as claimed in claim 14, wherein the first power generation is one of a tidal power generation and a wind power generation, and the first and the second voltages are integrated for a further use.

16. A method as claimed in claim 14, wherein the second power generation is one of a tidal power generation and a wind power generation, and the first and the second voltages are integrated for a further use.

17. A method as claimed in claim 14, wherein the step of integrating the first and the second voltages includes sub-steps of:
   rectifying, inverting and then boosting the second voltage to the third voltage; and
   boosting the first voltage to the third voltage.

18. A method as claimed in claim 17, wherein the step of integrating the first and the second voltages further includes a sub-step of regulating the third voltage.

19. A method as claimed in claim 14, wherein the first power generation is a wind power generation, and the second power generation is a tidal power generation.

20. A method as claimed in claim 19, wherein the step of integrating the first and the second voltages includes sub-steps of:
   rectifying, inverting and then boosting the second voltage to the third voltage;
   boosting the first voltage to the third voltage; and
   regulating the third voltage.

* * * * *